(12) United States Patent
Dasgupta et al.

(10) Patent No.: US 11,182,676 B2
(45) Date of Patent: Nov. 23, 2021

(54) COOPERATIVE NEURAL NETWORK DEEP REINFORCEMENT LEARNING WITH PARTIAL INPUT ASSISTANCE

(71) Applicant: International Business Machines Corporation, Armonk, NY (US)

(72) Inventors: Sakyasingha Dasgupta, Tokyo (JP); Takayuki Osogami, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 1147 days.

(21) Appl. No.: 15/669,146

(22) Filed: Aug. 4, 2017

(65) Prior Publication Data

US 2019/0042943 A1 Feb. 7, 2019

(51) Int. Cl.
*G06N 3/08* (2006.01)
*G06N 3/04* (2006.01)
*G06N 7/00* (2006.01)

(52) U.S. Cl.
CPC ........... *G06N 3/084* (2013.01); *G06N 3/0454* (2013.01); *G06N 7/005* (2013.01)

(58) Field of Classification Search
CPC ....... G06N 3/0454; G06N 3/084; G06N 7/005
See application file for complete search history.

(56) References Cited

U.S. PATENT DOCUMENTS

| 9,547,818 B2 | 1/2017 | Osogami et al. |
| 2015/0100530 A1 | 4/2015 | Mnih et al. |
| 2016/0092767 A1 | 3/2016 | Osogami et al. |
| 2017/0032245 A1 | 2/2017 | Osband et al. |
| 2019/0019080 A1* | 1/2019 | Claessens ............ G05B 13/027 |

FOREIGN PATENT DOCUMENTS

WO 2017019555 A1 2/2017

OTHER PUBLICATIONS

Hausknecht, Matthew, and Peter Stone. "Deep recurrent q-learning for partially observable mdps." arXiv:1507.06527v4 (Jan. 2017). (Year: 2017).*

(Continued)

*Primary Examiner* — Benjamin P Geib
(74) *Attorney, Agent, or Firm* — Stosch Sabo

(57) ABSTRACT

Deep reinforcement learning of cooperative neural networks can be performed by obtaining an action and observation sequence including a plurality of time frames, each time frame including action values and observation values. At least some of the observation values of each time frame of the action and observation sequence can be input sequentially into a first neural network including a plurality of first parameters. The action values of each time frame of the action and observation sequence and output values from the first neural network corresponding to the at least some of the observation values of each time frame of the action and observation sequence can be input sequentially into a second neural network including a plurality of second parameters. An action-value function can be approximated using the second neural network, and the plurality of first parameters of the first neural network can be updated using backpropagation.

17 Claims, 7 Drawing Sheets

(56) References Cited

OTHER PUBLICATIONS

Andrecut et al., "Deep-Sarsa: A Reinforcement Learning Algorithm for Autonomous Navigation", International Journal of Modern Physics C, Computational Physics and Physical Computation, vol. 12, Issue 10, Dec. 2001. http://www.worldscientific.com/doi/abs/10.1142/S0129183101002851? journalCode=ijmpc& last accessed Aug. 2, 2017. 1 page.

Ma et al., "Exploration of Reinforcement Learning to SNAKE", http://cs229.stanford.edu/proj2016spr/report/060.pdf 5 pages.

Mnih et al., "Human-level control through deep reinforcement learning", Research Letter, Feb. 26, 2015. vol. 518, Nature. 13 pages.

Tesauro, "Temporal Difference Learning and TD-Gammon", Communication of the ACM, Mar. 1995/ vol. 38, No. 3. 16 pages.

Wang, "Deep Reinforcement Learning", TU/e Department of Mathematics and Computer Science Web Engineering Research Group, Case Study with Standard RL Testing Domains, Mar. 21, 2016. 38 pages.

Wang et al., "Dueling Network Architectures for Deep Reinforcement Learning", Cornell University Library, Submitted Nov. 20, 2015(v1), last revised Apr. 5, 2016 (this version, V3). https://arxiv.org/abs/1511.06581 15 pages.

Dasgupta et al., "Neural Network Reinforcement Learning", U.S. Appl. No. 15/403,917, filed Jan. 11, 2017.

\* cited by examiner

COOPERATIVE NEURAL NETWORK DEEP REINFORCEMENT LEARNING WITH PARTIAL INPUT ASSISTANCE

BACKGROUND

The present disclosure relates to machine learning, and, more specifically, to cooperative multilayered deep neural networks.

Deep reinforcement learning, such as a deep-Q-network (DQN) using convolutional neural networks can be unstable and need specific architectural setup of a target-Q network and replay memory buffer for learning. Standard DQNs cannot be used directly for learning partially observable Markov decision process (POMDP) problems.

SUMMARY

Aspects of the present disclosure are directed toward a computer program product comprising a computer readable storage medium having program instructions embodied therewith. The program instructions can be executed by a processor to cause the processor to perform a method comprising obtaining an action and observation sequence including a plurality of time frames, each time frame including action values and observation values. The method can further comprise inputting at least some of the observation values of each time frame of the action and observation sequence sequentially into a first neural network including a plurality of first parameters. The method can further comprise inputting the action values of each time frame of the action and observation sequence and output values from the first neural network corresponding to the at least some of the observation values of each time frame of the action and observation sequence sequentially into a second neural network including a plurality of second parameters. The method can further comprise approximating an action-value function using the second neural network, and updating the plurality of first parameters using backpropagation.

Further aspects of the present disclosure are directed toward a method comprising obtaining an action and observation sequence including a plurality of time frames, each time frame including action values and observation values. The method can further comprise inputting at least some of the observation values of each time frame of the action and observation sequence sequentially into a first neural network including a plurality of first parameters. The method can further comprise inputting the action values of each time frame of the action and observation sequence and output values from the first neural network corresponding to the at least some of the observation values of each time frame of the action and observation sequence sequentially into a second neural network including a plurality of second parameters. The method can further comprise approximating an action-value function using the second neural network, and updating the plurality of first parameters using backpropagation.

Further aspects of the present disclosure are directed toward an apparatus comprising an obtaining section configured to obtain an action and observation sequence including a plurality of time frames, each time frame including action values and observation values. The apparatus can further comprise an input section configured to input at least some of the observation values of each time frame of the action and observation sequence sequentially into a first neural network including a plurality of first parameters, and input the action values of each time frame of the action and observation sequence and output values from the first neural network corresponding to the at least some of the observation values of each time frame of the action and observation sequence sequentially into a second neural network including a plurality of second parameters. The apparatus can further comprise an approximating section configured to approximate an action-value function using the second neural network. The apparatus can further comprise an updating section configured to update the plurality of first parameters using backpropagation.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
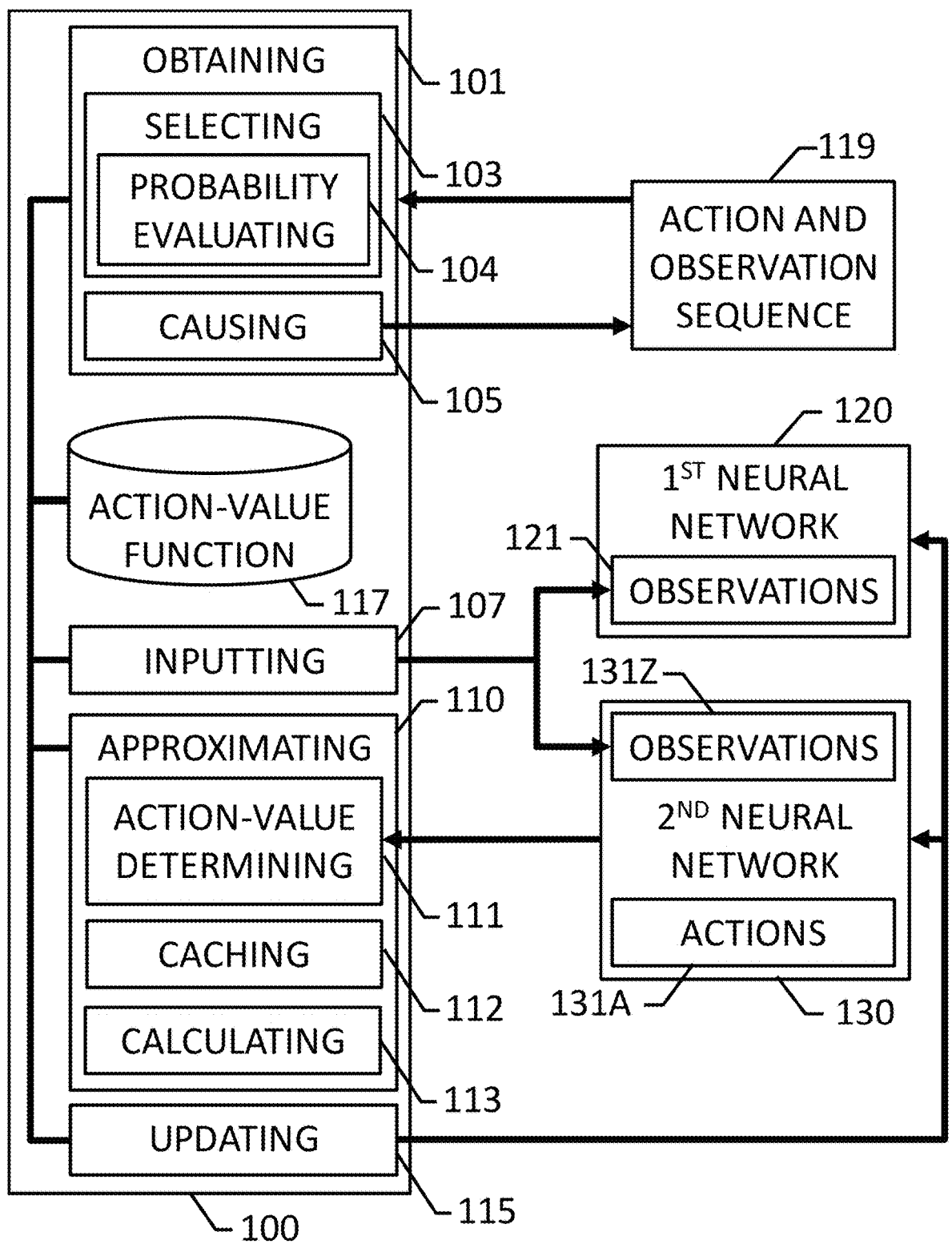
FIG. 1 shows an apparatus for cooperative neural network deep reinforcement learning with partial input assistance, according to some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Hereinafter, example embodiments of the present disclosure will be described. The example embodiments shall not limit the disclosure according to the claims, and the combinations of the features described in the embodiments are not necessarily essential to the disclosure.

The present disclosure relates to assisting a neural network with a portion of input with a cooperative multilayered deep neural network and using the initial neural network to learn action sequences. More specifically, the present disclosure relates to assisting a memory enabled neural network by processing observations associated with a Partially Observable Markov Decision Process (POMDP) with a cooperative neural network. The parameters of the cooperative neural network can be updated via backpropagation.

The original dynamic Boltzmann machine (DyBM), which learns a generative model of multi-dimensional time-series data, is an unsupervised learning model, but can be extended for learning with rewards or punishments i.e. reinforcement learning (RL) with the method of Dynamic State-Action-Reward-State-Action (DySARSA), i.e. updating the parameters of DyBM using a temporal difference (TD) learning approach with the energy of DyBM as the action-value linear function approximator.

Based on evaluative feedback in the form of rewards or punishments, reinforcement learning with DySARSA provides a framework for efficient control that learns action sequences in order to increase and/or maximize the average reward over time.

Embodiments herein can include an apparatus and method for combining a deep feed-forward network, such as a convolutional neural network (CNN), with a linear TD-learning DySARSA network, such as a DyBM, in order to perform stable state of the art deep SARSA reinforcement learning in POMDP applications.

Embodiments can present a learning rule to update the DyBM parameters utilizing its energy function as a linear function approximator and use the TD-error generated by DyBM as the cost function to learn CNN parameters end-to-end with back propagation through the CNN layers. This can allow the DyBM to learn optimal actions using DySARSA with a Boltzmann exploration policy without backpropagation, while using a deep neural network like CNN to obtain complex features of the input observations.

FIG. 1 shows an apparatus for cooperative neural network deep reinforcement learning with partial input assistance, according to some embodiments of the present disclosure. Apparatus 100 can be a host computer such as a server computer or a mainframe computer that executes an on-premise application and hosts client computers that use it. Apparatus 100 can be a computer system that includes two or more computers. Alternatively, apparatus 100 can be a personal computer that executes an application for a user of apparatus 100. Apparatus 100 can perform partial input assistance on cooperative neural networks adapted for an action and observation sequence by using an assistant neural network to process observations before feeding them into a neural network that processes the entire action and observation sequence, and updating the parameters of the assistant neural network based on the action-value function of the neural network, which can also be updated based on the action-value function of the neural network.

Apparatus 100 can include an obtaining section 101, which can include a selecting section 103 including a probability evaluating section 104, and a causing section 105, an inputting section 107, an approximating section 110, which can include an action-value determining section 111, a caching section 112, and a calculating section 113, and an updating section 115. Apparatus 100 can be a computer program product including one or more computer readable storage mediums collectively storing program instructions that are executable by a processor or programmable circuitry to cause the processor or programmable circuitry to perform the operations of the various sections. Apparatus 100 can alternatively be analog or digital programmable circuitry, or any combination thereof. Apparatus 100 can alternatively be a computer on which the computer program product is installed. Apparatus 100 can be composed of physically separated storage or circuitry that interacts through communication.

Apparatus 100 can interact with action and observation sequence 119, which can be a person, a machine, or other object subject to modelling as a POMDP. The observations can be observed through sensors, and actions can be caused through instructions or physical interaction. Action and observation sequence 119 can be represented by a computer program, such as a game, which is bound by a digitally created environment. Such a computer program can be observed by receiving data output from the program, and actions can be caused by issuing commands to be executed by the computer program.

Obtaining section 101 can receive data from data storage in communication with apparatus 100. For example, obtaining section 101 can be operable to obtain an action and observation sequence, such as action and observation sequence 119. Action and observation sequence 119 can be obtained sequentially as the actions are performed and the observations are observed. For example, obtaining section 101 can be operable to obtain an observation of a subsequent time frame of action and observation sequence 119. Alternatively, obtaining section 101 can be operable to obtain an entire action and observation sequence for a set of time frames, such as a training sequence, complete with actions and observations at each time frame. Obtaining section 101 can communicate directly with such data stores, or can utilize a transceiver to communicate with a computer through wired or wireless communication across a network.

Selecting section 103 can select an action. For example, selecting section 103 can be operable to select an action, using second neural network 130, with which to proceed from a current time frame of the action and observation sequence to a subsequent time frame of action and observation sequence 119.

Probability evaluating section 104 can evaluate a reward probability of a possible action. For example, probability evaluating section 104 can be operable to evaluate each reward probability of a plurality of possible actions according to a probability function based on an action-value function, such as action-value function 117. In some embodiments, selecting section 103 can select the possible action that yields a large or the largest reward probability from the probability function.

Causing section 105 can cause an action to be performed. For example, causing section 105 can be operable to cause the action selected by selecting section 103 to be performed in the subsequent time frame of action and observation sequence 119.

Inputting section 107 can input values into input nodes of cooperative neural networks. For example, inputting section 107 can be operable to input at least some of the observation values of each time frame of action and observation sequence 119 sequentially into input nodes 121 (also referred to as observations 121) of first neural network 120, which includes a plurality of first parameters, and can also be operable to input the action values of each time frame of action and observation sequence 119 and output values from first neural network 120 corresponding to the input observation values of each time frame of action and observation sequence 119 sequentially into input nodes 131A (also referred to as actions 131A in second neural network 130)

and input nodes 131Z (also referred to as observations 131Z in second neural network 130), respectively, of second neural network 130, which includes a plurality of second parameters.

Approximating section 110 can approximate an action-value function of a neural network. For example, approximating section 110 can approximate action-value function 117 using second neural network 130.

Action-value determining section 111 can determine an action-value. For example, action-value determining section 111 can be operable to determine a current action-value from an evaluation of action-value function 117 in consideration of an actual reward.

Caching section 112 can cache values and parameters for functions and neural networks. For example, caching section 112 can be operable to cache a previous action-value determined for a previous time frame from action-value function 117. Caching section 112 can also be operable to cache parameters of cooperative neural networks such as first neural network 120 and second neural network 130, such as eligibility traces, weights, biases, and function parameters for determining such parameters of cooperative neural networks such as first neural network 120 and second neural network 130.

Calculating section 113 can calculate parameters. For example, calculating section 113 can be operable to calculate a temporal difference error based on the previous action-value, the current action-value, and the plurality of parameters of second neural network 130.

Updating section 115 can update the parameters of cooperative neural networks, such as first neural network 120 and second neural network 130. For example, updating section 115 can update the plurality of parameters of first neural network 120 using an error based on the approximated action-value function 117 and a reward. Updating section 115 can update the parameters of first neural network 120 based on backpropagation of the gradient of the parameters of the first neural network 120 with respect to the temporal difference error.

An apparatus, such as apparatus 100, can be beneficial when the first neural network is a Deep Feed-Forward Network, such as a multilayered Convolutional Neural Network (CNN). Apparatus 100 can also be beneficial when the second neural network is a neural network that is a linear function approximator and has memory capabilities, such as a Dynamic Boltzmann Machine (DyBM).

A DyBM can be defined from a Boltzmann machine (BM) having multiple layers of units, where one layer represents the most recent values of a time-series, and the remaining layers represent the historical values of the time-series. The most recent values are conditionally independent of each other given the historical values. It can be equivalent to such a BM having an infinite number of layers, so that the most recent values can depend on the whole history of the time series. For unsupervised learning, a DyBM can be trained in such a way that the likelihood of a given time-series is increased and/or maximized with respect to the conditional distribution of the next values given the historical values. Similar to a BM, a DyBM can consist of a network of artificial neurons. In some embodiments using a DyBM, each neuron can take a binary value, 0 or 1, following a probability distribution that depends on the parameters of the DyBM. In other embodiments using a DyBM, each neuron can take a real value, an integer value, or a multi-value. Unlike the BM, the values of the DyBM can change over time in a way that depends on its previous values. That is, the DyBM can stochastically generate a multi-dimensional series of binary values.

Learning in conventional BMs can be based on a Hebbian formulation, but is often approximated with a sampling based strategy like contrastive divergence. In this formulation, the concept of time is largely missing. In DyBM, like biological networks, learning can be dependent on the timing of spikes. This is called spike-timing dependent plasticity, or STDP, which means that a synapse is strengthened if the spike of a pre-synaptic neuron precedes the spike of a post-synaptic neuron (long term potentiation—LTP), and the synapse is weakened if the temporal order is reversed (long term depression—LTD). The conventional DyBM can use an exact online learning rule that has the properties of LTP and LTD.

In embodiments of an apparatus in which entire action and observation sequences are obtained at once, such as training sequences, the apparatus cannot require a selecting section or a causing section, because the actions are already determined as part of the sequence.

Figure 2:
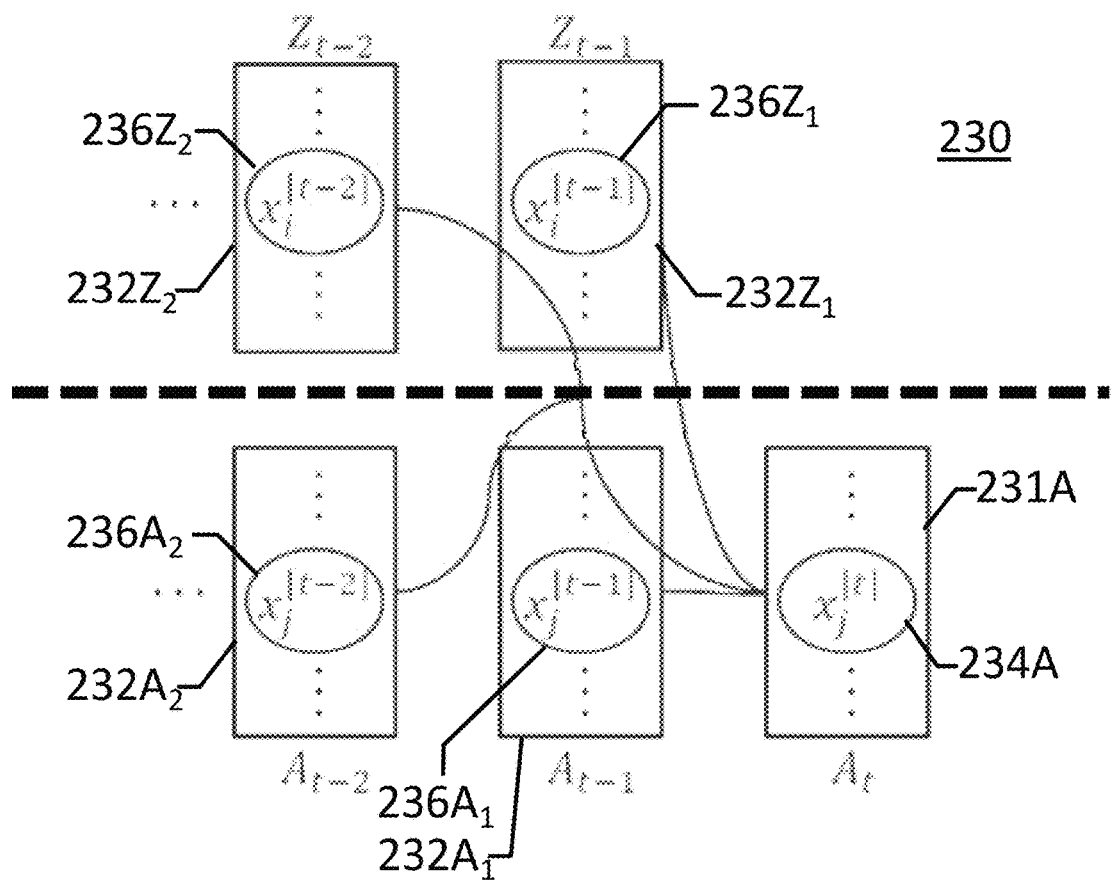
FIG. 2 shows a dynamic Boltzmann machine (DyBM) as an example of a neural network, according to some embodiments of the present disclosure.

FIG. 2 shows a dynamic Boltzmann machine (DyBM) as an example of a neural network, according to some embodiments of the present disclosure. DyBM 230 can include a plurality of layers of nodes (e.g. layers 231A, 232A$_1$, 232A$_2$, 232Z$_1$, and 232Z$_2$) among a plurality of nodes (e.g. 234A, 236A$_1$, 236A$_2$, 236Z$_1$, and 236Z$_2$). Each layer sequentially forwards input values of a time frame of the action and observation sequence to a subsequent layer among the plurality of layers. The plurality of layers of nodes includes a first layer 231A of input nodes, such as input node 234A, and a plurality of intermediate layers, such as intermediate layer 232A/232Z. In the first layer 231A, the input nodes 234A receive input values representing an action of a current time frame of the action and observation sequence. The plurality of layers of nodes can also include another first layer of other input nodes that receive input values representing an observation of a current time frame of the action and observation sequence.

Figure 3:
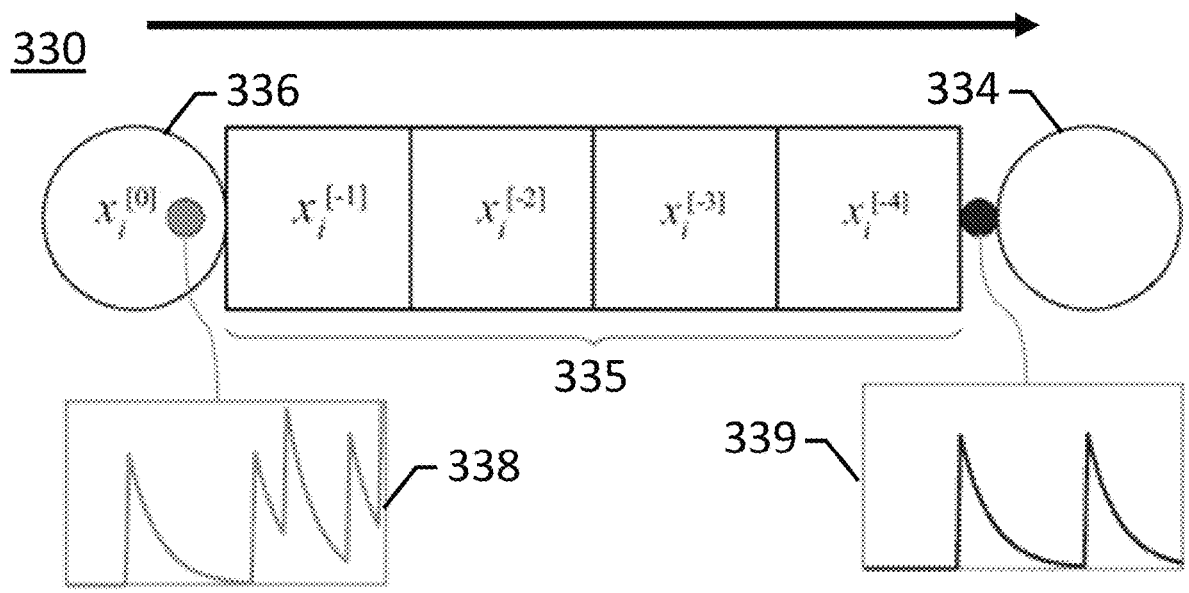
FIG. 3 shows a connection between a pre-synaptic neuron and a post-synaptic neuron via a first-in-first-out (FIFO) queue in DyBM, according to some embodiments of the present disclosure.

Each node, such as action node 236A and observation node 236Z, in each intermediate layer forwards a value representing an action or an observation to a node in a subsequent or shared layer. FIG. 2 shows three time frames, t, t−1, and t−2. Each time frame is associated with an action, A, and an observation, Z. The action at time t is represented as $A_t$. The action at time t−1 is represented as $A_{t-1}$, and the action at time t−2 is represented as $A_{t-2}$. The observation at time t−1 is represented as $Z_{t-1}$, and the observation at time t−2 is represented as $Z_{t-2}$. FIG. 3 does not show an observation at time t, because DyBM 230 is shown at a moment in which action $A_t$ is being determined, but has not been caused. Thus, in this moment, each other node is pre-synaptic to the nodes of action $A_t$ 231A. Once an action has been selected and caused, DyBM 230 will create input nodes for the observation at time t, $Z_t$, for storing binary numbers representing $Z_t$. In other implementations, observation $Z_t$ at time t can be input to $Z_{t-1}$ after the current values of $Z_{t-1}$, $Z_{t-2}$ are forwarded (e.g., forwarded to $Z_{t-2}$, $Z_{t-3}$) and the current values of $A_{t-1}$, $A_{t-2}$ are forwarded (e.g., forwarded to $A_{t-2}$, $A_{t-3}$).

In FIG. 2, values representing an action A at time t, t−1, t−2, . . . are denoted $x_j^{[t]}$, $x_j^{[t-1]}$, and $x_j^{[t-2]}$, where j ($1 \leq j \leq N_a$) represents a node number relating to an action and $N_a$ represents a number of values (or nodes) in an action. Values representing an observation Z at time t, t−1, and t−2, . . . are denoted $x_i^{[t]}$, $x_i^{[t-1]}$, $x_i^{[t-2]}$, where i ($1 \leq i \leq N_b$) represents a node number relating to an observation and $N_b$ represents a number of values (or nodes) in an observation.

Each action, A, and each observation, Z, at each time frame of DyBM 230 can be represented as a plurality of binary numbers. For example, if there are 256 possible actions, then each action can be represented as a permutation of 8 binary numerals. Input node 234A is a binary numeral representing the action at time t, and is represented as $x_j^{[t]}$. Action node 236A$_2$ is a binary numeral representing the action at time t−2, and is represented as $x_j^{[t-2]}$. The action node representing the action at time t−1 is represented as $x_j^{[t-1]}$. Observation node 236Z$_2$ is a binary numeral representing the observation at time t−2, and is represented as $x_i^{[t-2]}$. The observation node representing the observation at time t−1 is represented as $x_i^{[t-1]}$.

DyBM 230 can also include a plurality of weight values among the plurality of parameters of the neural network. Each weight value is to be applied to each value in the corresponding node to obtain a value propagating from a pre-synaptic node to a post-synaptic node.

FIG. 3 shows a connection between a pre-synaptic neuron 336, which has a neural eligibility trace 338, and a post-synaptic neuron 334, which has a synaptic eligibility trace 339, via a first-in-first-out (FIFO) queue 335 according to some embodiments of the present disclosure. Although the diagram of DyBM 330 shown in FIG. 3 looks different from the diagram of DyBM 230 shown in FIG. 2, these diagrams represent a same or similar structure of DyBM. In FIG. 3, values from nodes $x_j^{[t-1]}$, $x_j^{[t-2]}$, ... of the same j in FIG. 2 are sequentially stored in a FIFO queue 335 as an implementation of, for example node 236A$_1$ forwarding a value from the action and observation sequence. In FIG. 3, values from nodes of the same i in FIG. 2 are also sequentially stored in a FIFO queue 335.

In FIG. 3, DyBM 330 can comprise a set of neurons having memory units and FIFO queues. Let N be the number of neurons. Each neuron can take a binary value at each moment. For $j \in [1, N]$, let $x_j^{[t]}$ be the value of the j-th neuron at time t.

A neuron, $i \in [1, N]$, can be connected to another neuron, $j \in [1, N]$, with a FIFO queue of length $d_{i,j}-1$, where $d_{i,j}$ is the axonal or synaptic delay of conductance, or conduction delay, from the pre-synaptic neuron, i, to the post-synaptic neuron, j. Please note that the usage of i and j in FIG. 3 is different from that of FIG. 2, since the above usage is more convenient to explain the diagram of FIG. 3. We assume $d_{i,j} \geq 1$. At each moment t, the tail of the FIFO queue holds $x_i^{[t-1]}$, the head of the FIFO queue holds $x_i^{[t-d_{i,j}+1]}$. A single increment in time causes the value at the head of the FIFO queue to be removed, and the remaining values in the FIFO queues are pushed toward the head by one position. A new value is then inserted at the tail of the FIFO queue. Self-connections via a FIFO queue are permitted.

Each neuron stores a fixed number, L, of neural eligibility traces. For $l \in [1, L]$ and $j \in [1, N]$, let $\gamma_{j,l}^{[t-1]}$ be the l-th neural eligibility trace of the j-th neuron immediately before time t as described in Equation 1:

$$\gamma_{j,l}^{[t-1]} \equiv \sum_{s=-\infty}^{t-1} \mu_l^{t-s} x_j^{[s]}, \qquad \text{Eq. (1)}$$

In Equation 1, $\mu_l \in (0, 1)$ is the decay rate for the l-th neural eligibility trace, i.e. the neural eligibility trace is the weighted sum of the past values of that neuron, where the recent values have greater weight than the others.

Each neuron can also store synaptic eligibility traces, where the number of the synaptic eligibility traces depends on the number of the neurons that are connected to that neuron. Namely, for each of the (pre-synaptic) neurons that are connected to a (post-synaptic) neuron j, the neuron j stores a fixed number, K, of synaptic eligibility traces. For $k \in [1, K]$, let $\alpha_{i,j,k}^{[t-1]}$ be the k-th synaptic eligibility trace of the neuron j for the pre-synaptic neuron i immediately before time t as described in Equation 2:

$$\alpha_{i,j,k}^{[t-1]} \equiv \sum_{s=-\infty}^{t-d_{i,j}} \lambda_k^{t-s-d_{i,j}} x_i^{[s]}, \qquad \text{Eq. (2)}$$

where $\lambda_k \in (0, 1)$ is the decay rate for the k-th synaptic eligibility traces, i.e. the synaptic eligibility trace is the weighted sum of the values that has reached that neuron, j, from a pre-synaptic neuron, i, after the conduction delay, $d_{i,j}$.

The values of the eligibility traces stored at a neuron, j, are updated locally at time t based on the value of that neuron, j, at time t and the values that have reached that neuron, j, at time t from its pre-synaptic neurons. Specifically, as described in Equation 3 and Equation 4:

$$\gamma_{j,l}^{[t]} \leftarrow \mu_l(\gamma_{j,l}^{[t-1]} + x_j^{[t]}), \qquad \text{Eq. (3)}$$

$$\alpha_{i,j,k}^{[t]} \leftarrow \lambda_k(\alpha_{i,j,k}^{[t-1]} + x_i^{t-d_{i,j}}), \qquad \text{Eq. (4)}$$

for $l \in [1,L]$ and $k \in [1, K]$, and for neurons i that are connected to j.

The learnable parameters of DyBM 330 are bias and weight. Specifically, each neuron, j, is associated with bias, $b_j$. Each synapse, or each pair of neurons that are connected via a FIFO queue, is associated with the weight of long term potentiation (LTP weight) and the weight of long term depression (LTD weight). The LTP weight from a (pre-synaptic) neuron, i, to a (post-synaptic) neuron, j, is characterized with K parameters, $u_{i,j,k}$ for $k \in [1, K]$. The k-th LTP weight corresponds to the k-th synaptic eligibility trace for $k \in [1, K]$. The LTD weight from a (pre-synaptic) neuron, i, to a (post-synaptic) neuron, j, is characterized with L parameters, $v_{i,j,l}$ for $l \in [1,L]$. The l-th LTD weight corresponds to the f-th neural eligibility trace for $l \in [1,L]$. The learnable parameters of such a DyBM neural network are collectively denoted with θ.

Similar to the conventional Boltzmann Machine (BM), the energy of DyBM 330 determines what patterns of the values that DyBM 330 is more likely to generate than others. Contrary to the conventional BM, the energy associated with a pattern at a moment depends on the patterns that DyBM 330 has previously generated. Let $x^{[t]} = (x_j^{[t]})_{j \in [1,N]}$ be the vector of the values of the neurons at time t. Let $x^{[:t-1]} = (x^{[s]})_{s<t}$ be the sequence of the values of DyBM 330 before time t. The energy of DyBM 230 at time t depends not only on $x^{[t]}$ but also on $x^{[:t-1]}$, which is stored as eligibility traces in DyBM 330. Let $E_\theta(x^{[t]}|x^{[:t-1]})$ be the energy of DyBM 330 at time t. The lower the energy of DyBM 330 with particular values $x^{[t]}$, the more likely DyBM 330 takes those values. The energy of DyBM 330 can be decomposed into the energy of each neuron at time t as described in Equation 5:

$$E_\theta(x^{[t]} | x^{[:t-1]}) = \sum_{j=1}^{N} E_\theta(x^{[t]} | x^{[:t-1]}), \qquad \text{Eq. (5)}$$

The energy of the neuron j at time t depends on the value it takes as described in Equation 6:

$$E_\theta(x^{[t]} \mid x^{[:t-1]}) = -b_j x_j^{[t]} - \sum_{i \in A \cup Z} \sum_{k=1}^{K} u_{i,j,k} \alpha_{i,j,k}^{[t-1]} x_j^{[t]} + \sum_{i \in A \cup Z} \sum_{\ell=1}^{L} v_{i,j,\ell} \beta_{i,j,\ell}^{[t-1]} x_j^{[t]} + \sum_{i \in A \cup Z} \sum_{\ell=1}^{L} v_{i,\ell} \gamma_{i,\ell}^{[t-1]} x_j^{[t]}, \quad \text{Eq. (6)}$$

Terms $u_{i,j,k}$ and $v_{i,j,\ell}$ are weights. The term $\beta_{i,j,\ell}^{[t-1]} x_j^{[t]}$ can be described by Equation 7:

$$\beta_{i,j,\ell}^{[t-1]} x_j^{[t]} \equiv \sum_{s=t-d_{i,j}+1}^{t-1} \mu_\ell^{s-t} x_i^{[s]}. \quad \text{Eq. (7)}$$

To perform reinforcement learning with SARSA for a POMDP using DyBM 330, the set of nodes (neurons) in the network are divided into two groups. One group represents actions and is denoted by A. The other represents observations and is denoted by Z. That is, an action that we take at time t is denoted by a vector $x_A^{[t]} \equiv (x_j^{[t]})_{j \in A}$, and the observation that we make immediately after we take that action is analogously denoted by $x_Z^{[t]}$. The pair of the action and the observation at time t is denoted by $x \equiv (x_j^{[t]})_{j \in A \cup Z}$. Here, an observation can include the information about the reward that we receive, if the past reward affects what actions will be optimal in the future. The actions that we take are certainly observable, but are separated for convenience.

In some embodiments, it is also possible to predict values of an observation $Z_t$ once an action $A_t$ has been fixed in the neural network. In this case, values $x_i^{[t]}$ in $Z_t$ can also be predicted, and $Z_t$ works as an input layer including input nodes $x_i^{[t]}$. In further embodiments, all of the values $x_i^{[t]}$ and $x_j^{[t]}$ of both $Z_t$ and $A_t$ can be predicted.

DyBM exhibits some of the key properties of STDP due to its structure consisting of conduction delays, such as pre-synaptic neuron 336, and memory units, such as FIFO queue 335. A neuron can be connected to another in a way that a spike from pre-synaptic neuron 336, i, travels along an axon and reaches post-synaptic neuron 334, j, via a synapse after a delay consisting of a constant period, $d_{i,j}$. FIFO queue 335 causes this conduction delay. FIFO queue 335 can store the values of pre-synaptic neuron 336 for the last $d_{i,j}-1$ units of time. Each stored value can be pushed one position toward the head of the queue when the time is incremented by one unit. The value of pre-synaptic neuron 336 is thus given to post-synaptic neuron 334 after the conduction delay. Moreover, the DyBM aggregates information about the spikes in the past into neural eligibility trace 338 and synaptic eligibility trace 339, which are stored in the memory units. Each neuron is associated with a learnable parameter called bias. The strength of the synapse between pre-synaptic neuron 336 and post-synaptic neuron 334 is represented by learnable parameters called weights, which can be further divided into LTP and LTD components.

Figure 4:
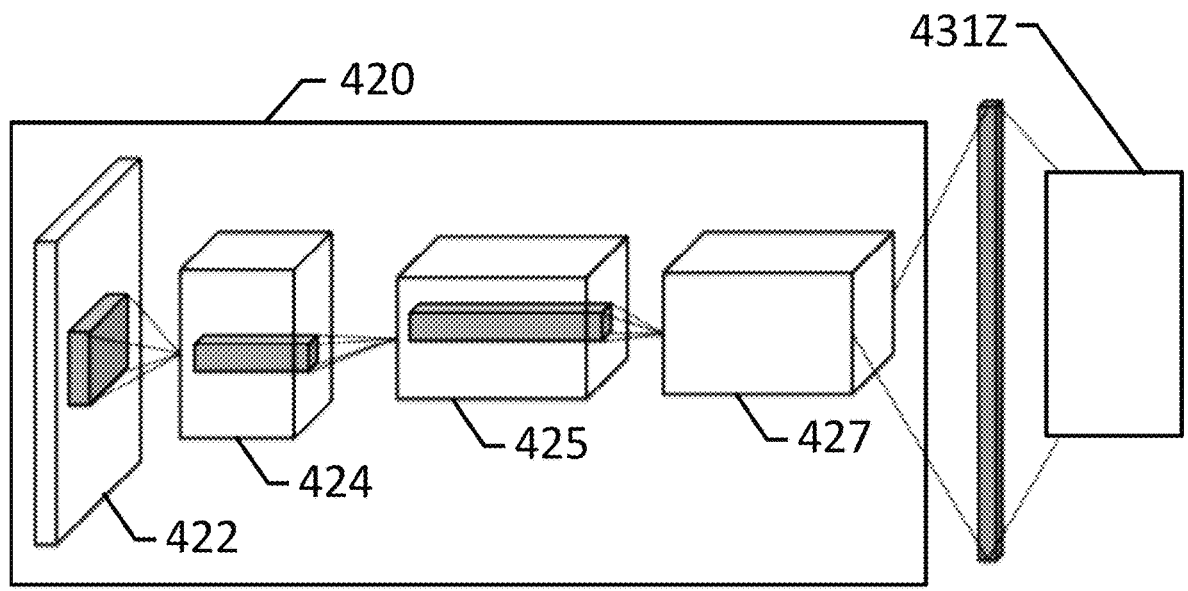
FIG. 4 shows a multilayered convolutional neural network (CNN) as an example of a deep neural network, according to some embodiments of the present disclosure.

FIG. 4 shows a multilayered convolutional neural network (CNN) 420 as an example of a deep neural network, according to some embodiments of the present disclosure. CNN 420 can include an input layer 422, intermediate layers 424 and 425, and an output layer 427. Input layer 422 can receive at least some of the observation values from an action and observation sequence, such as action and observation sequence 119 of FIG. 1. Intermediate layers 424 and 425 together with input layer 422 can be used for deep representational capabilities of the input observation values. This can be beneficial when the input observation values correspond to an image. Output layer 427 can scale or normalize values between 0 and 1. The output values from output layer 427 of CNN 420 can be input into observation input nodes 431Z of a DyBM or other suitable neural network. For example, output layer 427 can be a fully connected layer representing the observational state information for the DyBM based DySARSA network. Output layer 427 can be referred to as a Rectified Linear Unit (ReLU) layer. In this manner, CNN 420 can assist the DyBM with part of the input values to the DyBM. For example, CNN 420 can include a plurality of layers of nodes among a plurality of nodes, each layer forwarding input values to a subsequent layer among the plurality of layers, the plurality of layers of nodes including an input layer including the plurality of input nodes among the plurality of nodes, the input nodes receiving input values representing an observation of a current time frame of the action and observation sequence, at least one intermediate layer, each node in the at least one intermediate layer forwarding a value representing an observation to a node in a subsequent layer, and an output layer, each node in the output layer converting a value representing an observation to a value between 0 and 1, and a plurality of weight values among the plurality of first parameters of the first neural network, each weight value to be applied to each value in the corresponding node to obtain a value propagating from a pre-synaptic node to a post-synaptic node.

In the embodiment in FIG. 4, the CNN has 3 layers. However, in other embodiments, a CNN can have any number of layers, which can vary depending on the complexity of the input.

Figure 5:
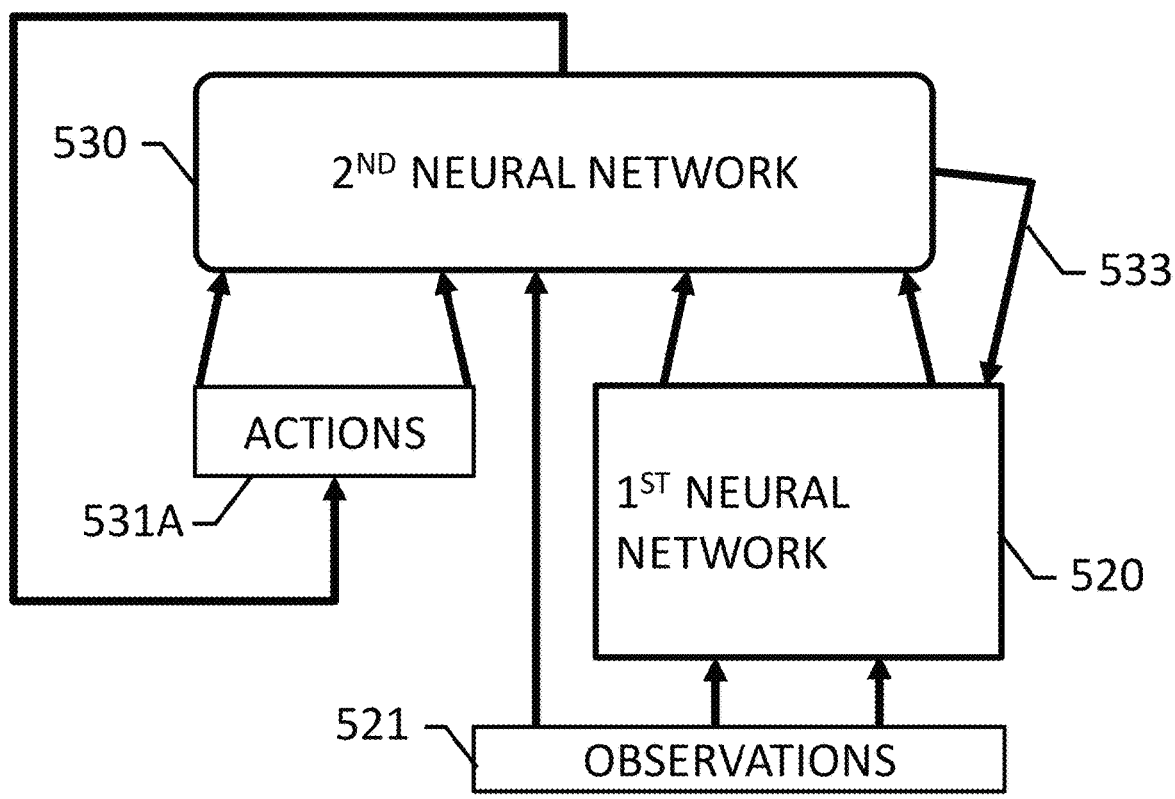
FIG. 5 shows a diagram of cooperative neural networks performing deep reinforcement learning with partial input assistance, according to some embodiments of the present disclosure.

FIG. 5 shows a diagram of cooperative neural networks performing deep reinforcement learning with partial input assistance, according to some embodiments of the present disclosure. Cooperative neural networks for partial input assistance can include a first neural network 520 and a second neural network 530. First neural network 520 can receive at least some of observation values 521 and output processed values. Second neural network 530 can receive action values 531A, the processed values output from first neural network 520 that correspond to the input observation values 521, and any remaining observation values 521 that were not input to first neural network 520, such as observation values representing a reward, and output action values 531A, each sequentially output action values 531A correspond to the next time frame following the time frame of the input values. Calculation of a Temporal Difference (TD) error 533 of second neural network 530 can be used to approximate an action-value function of second neural network 530, which can in turn be used to update parameters of first neural network 520.

FIG. 5 depicts a cooperative neural network system for performing a method of reinforcement learning by selecting actions in partial input assistance where second neural network 530 can select actions and evaluate the values of those actions in view of prior actions and observations, while first neural network 520 can convert complex observation input into a more easily processable form for second neural network 530. For example, first neural network 520 can convert raw image data into data representing individual features through a process of feature recognition. This can be beneficial for second neural networks that use binary input, such as a DyBM. Second neural network 530 can choose the actions based on its energy, such as when second neural network is a DyBM, and the parameters of second neural network 530 can be updated using this energy. In many embodiments, second neural network 530 can be divided into two parts. One group of nodes can represent actions, and is denoted by A. The other can represent observations, and is denoted by Z. The weight and bias parameters of second neural network 530 can be collectively denoted by θ. The observation can include information about an actual reward received in response to an action if the actual reward affects what actions will be optimal in the future. Second neural network 530 is connected to a suitable first neural network 520, whose parameters are denoted by $\theta_c$.

The second neural network parameters $\theta_t$ at each time step t can be updated using the TD error generated by first neural network, accumulating trace, and eligibility trace values as described in Equation 9:

$$\theta_{t+1} = \theta_t + \Delta_t e_t,$$ Eq. (9)

In Equation 9, $\Delta_t$ is the TD error and $e_t$ is the accumulating trace value. The accumulating trace value is given by Equation 10:

$$e_t = \gamma \lambda e_{t-1} + \eta \phi(S_t, A_t),$$ Eq. (10)

In Equation 10, γ is a discount factor, which is greater than zero and generally selected close to 1, λ can be a value close to zero, and η is a learning rate.

An action can be selected using a Boltzmann exploration policy and energy of the second neural network $E_\theta$ as described in Equation 11:

$$Pr(x_j^{[t]} = 1) = \frac{1}{1 + \exp(\tau^{-1} E_\theta(x_j^{[t]} = 1 \mid x^{[:t-1]}))},$$ Eq. (11)

Any suitable deep feed forward network can be used as the first neural network, such as a CNN. The parameters of the first neural network can be updated by calculating the gradient of the parameters with respect to the TD error of the second neural network updated with eligibility traces:

$$\frac{\partial \Delta}{\partial \theta_c}.$$

The parameters of the first neural network can be updated with layer-wise back propagation at every epoch.

Figure 6:
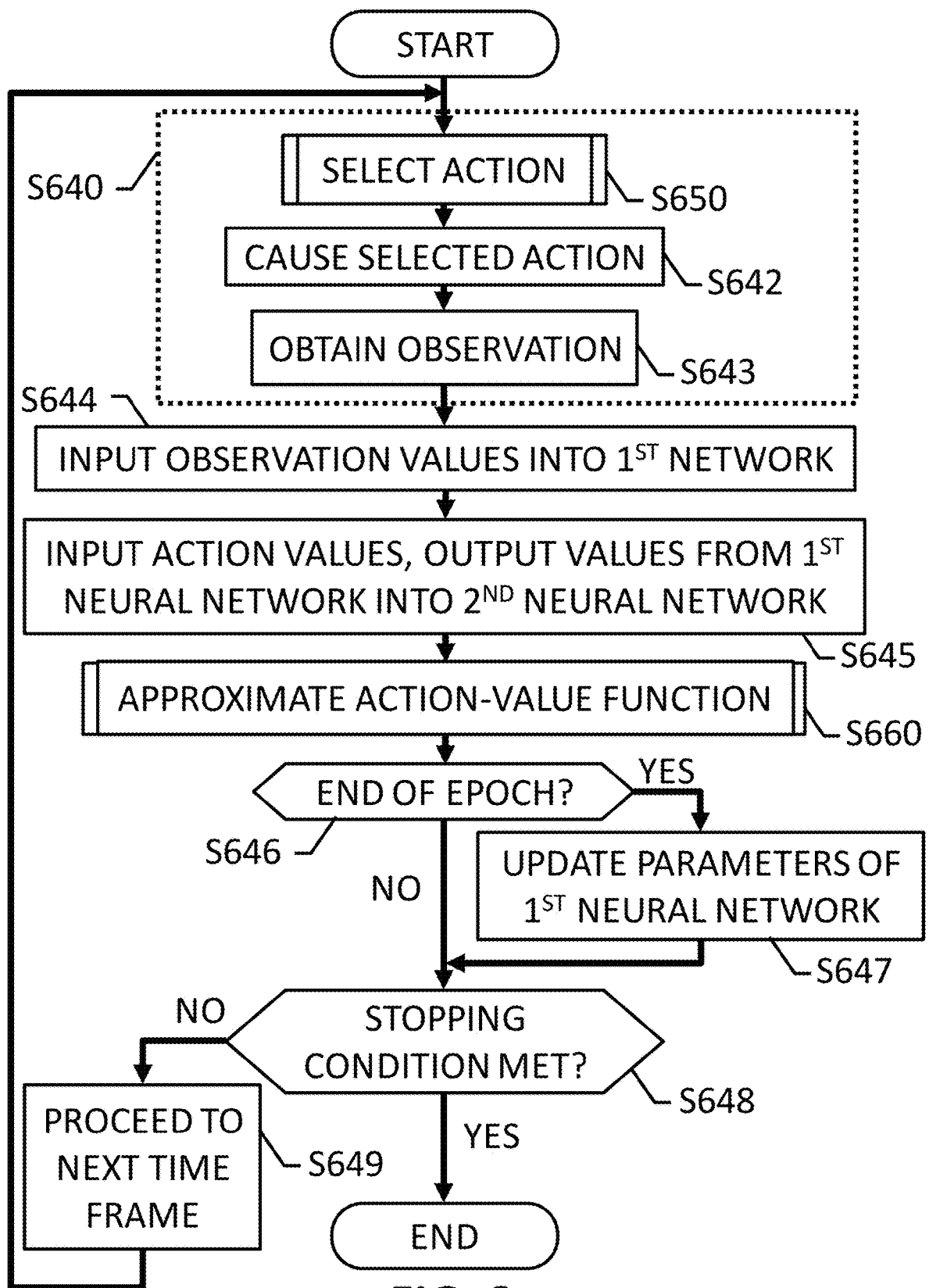
FIG. 6 shows an operational flow for cooperative neural network deep reinforcement learning with partial input assistance, according to some embodiments of the present disclosure.

FIG. 6 shows an operational flow for cooperative neural network deep reinforcement learning with partial input assistance, according to some embodiments of the present disclosure. The operational flow can provide a method of partial input assistance on a cooperative neural network system adapted for an action and observation sequence, such as the system shown in FIG. 5. The operations can be performed by an apparatus, such as apparatus 100.

At S640, an obtaining section, such as obtaining section 101, can obtain an action and observation sequence. More specifically, as the operational flow of FIG. 6 is iteratively performed, the iterations of the operations of S640 collectively amount to an operation of obtaining the action and observation sequence. Operation S640 can include operations S650, S642, and S643. Alternatively at S640, the obtaining section can obtain an entire action and observation sequence for a set of time frames, such as a training sequence, complete with actions and observations at each time frame.

At S650, a selecting section, such as selecting section 103, can select an action according to a probability function. For example, the selecting section can select an action, using the second neural network, with which to proceed from a current time frame of the action and observation sequence to a subsequent time frame of the action and observation sequence.

At S642, a causing section, such as causing section 105, can cause the selected action to be performed. For example, the causing section can cause the action selected at S650 to be performed in the subsequent time frame of the action and observation sequence. Depending on the nature of the action and observation sequence, actions can be caused through instructions or physical interaction, such as in the case of a human or machine, in which case the actions can be performed by the human or the machine, or caused by issuing commands to be executed by the computer program, in which case the actions are performed by the computer program.

At S643, the obtaining section can obtain an observation. For example, the obtaining section can obtain an observation of the subsequent time frame of the action and observation sequence. Once the selected action has been performed, certain observations can be sensed, detected, measured, or otherwise received by the obtaining section. The setting of reinforcement learning can be where a (Markovian) state cannot be observed (i.e., modeled as a partially observable Markov decision process or POMDP). If such a state was observable, a policy that maps a state to an action could be sought, because the future would become conditionally independent of the past given the state. In a partially observable state setting, the optimal policy can depend on the entire history of prior observations and actions, which are represented as $x_t^{[t-n]}$ in FIG. 2. In some embodiments, the observation obtained can also include or be accompanied by an actual reward, which can reduce the number of time frames required for convergence, but can also require more computational resources. The actual reward can be supplied through conscious feedback, such as in indication by a person, or calculated from, for example, a final state, and is therefore assumed to be factual.

At S644, an input section, such as input section 107, can input at least some of the observation values corresponding to the current time frame into the first neural network of a cooperative neural network system. As the operational flow of FIG. 6 is iteratively performed, the iterations of the operations of S644 collectively amount to the input section inputting at least some of the observation values of each time frame of the action and observation sequence sequentially into the first neural network of the cooperative neural network system.

At S645, the input section can input action values corresponding to the current time frame and output values from the first neural network corresponding to observation values of the current time frame into a second neural network of a cooperative neural network system. As the operational flow of FIG. 6 is iteratively performed, the iterations of the operations of S645 collectively amount to the input section inputting the action values of each time frame of the action and observation sequence and outputting values from the first neural network corresponding to the at least some of the observation values of each time frame of the action and observation sequence sequentially into a second neural network of the cooperative neural network system.

At S660, an approximating section, such as approximating section 110, can approximate an action-value function of a second neural network, such as second neural network 130. For example, the approximating section can approximate an action-value function based on the principles of SARSA or, when the second neural network is a DyBM, the principles of DySARSA.

AT S646, the apparatus can determine whether it is the end of an epoch. If the end of an epoch has been reached, such as if a designated number of iterations have been performed, then the operational flow proceeds to S647. If the end of an epoch has not been reached, such as if a designated number of iterations have not yet been performed, then the operational flow proceeds to S648.

At S647, an updating section, such as updating section 115, can update parameters of the first neural network of the cooperative neural network system. For example, the updating section can update a plurality of parameters of the first neural network based on the TD-error generated by the second neural network in approximating the action-value function by the approximating section.

At S648, the apparatus can determine whether a stopping condition is met. If the stopping condition is met, such as if a maximum number of iterations have been performed, then the operational flow is discontinued. If the stopping condition is not met, such as if a maximum number of iterations have not yet been performed, then the operational flow proceeds to S649.

At S649, the apparatus proceeds to the next time frame, and the operational flow returns to operation S640 to perform the next iteration. In the next iteration, the current time frame becomes a previous time frame, and the subsequent time frame becomes the current time frame.

In embodiments of operational flow for cooperative neural network reinforcement learning in which entire action and observation sequences are obtained at once, such as training sequences, the operational flow cannot require a selecting operation or a causing operation, because the actions are already determined as part of the sequence. In further embodiments, such training sequences can be run through the operational flow multiple times and combined with different training sequences to train the cooperative neural network system.

Figure 7:
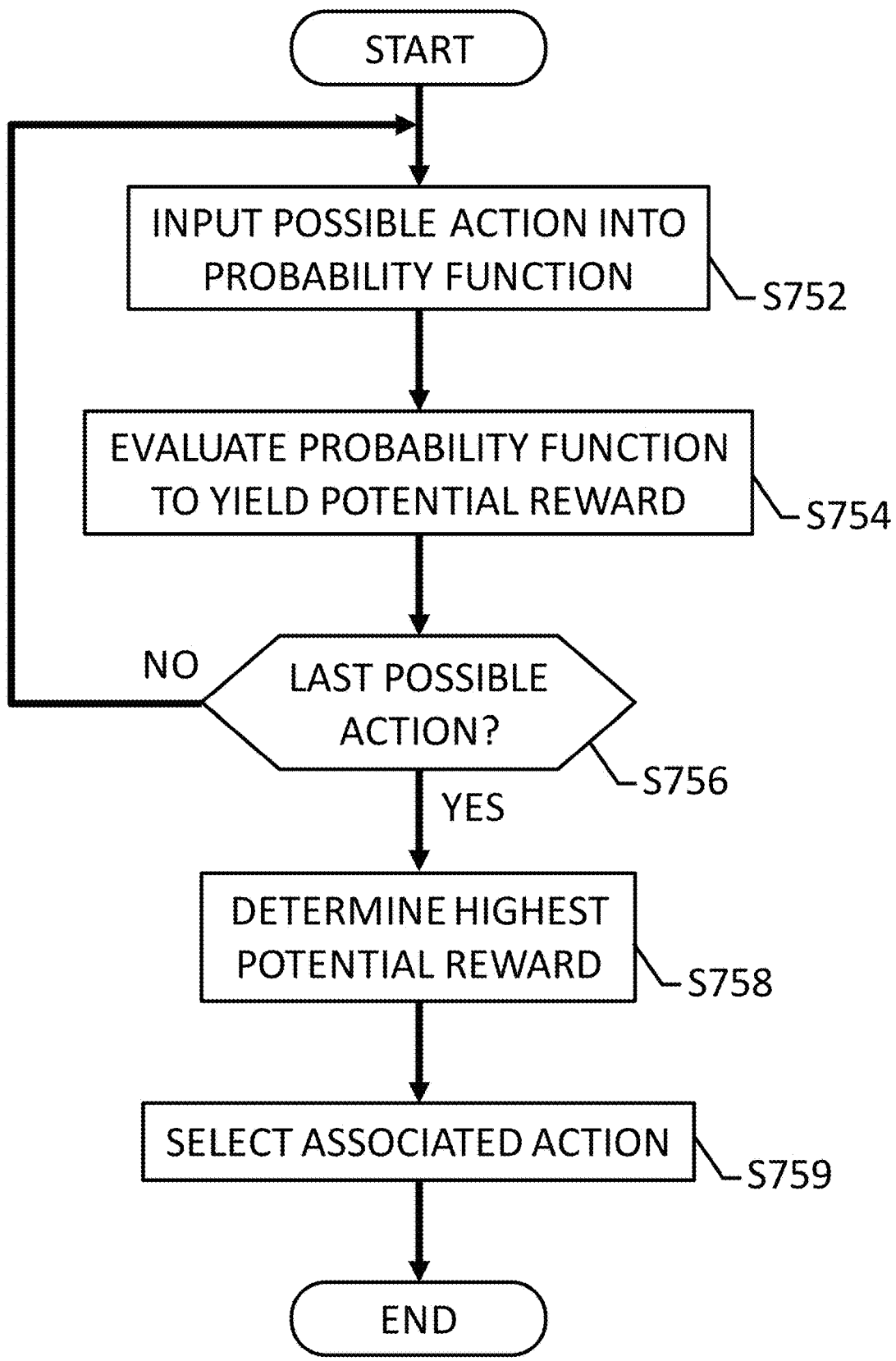
FIG. 7 shows an operational flow for selecting a possible action, according to some embodiments of the present disclosure.

FIG. 7 shows an operational flow for selecting a possible action, according to some embodiments of the present disclosure. The operational flow can provide a method of selecting an action according to a probability function. The operations can be performed by an apparatus, such as apparatus 100, using a second neural network, such as second neural network 130.

At S752, a selecting section, such as selecting section 103, can input a possible action into a probability function. For example, out of all possible actions, a single possible action can be input into the probability function. Once the possible action is input into the probability function, the selecting section can make an indication, such as by updating a pointer, so that the same possible action is not input into the probability function twice in a single time frame. In embodiments where the second neural network is as shown in FIG. 3, each permutation of binary action input nodes $x_j^{[t]}$ can represent a possible action.

At S754, a probability evaluating section, such as probability evaluating section 104, can evaluate the probability function to yield a reward probability, or the probability that a possible action will result in receiving a reward. As operations S752 and S754 are iteratively performed, the selecting section evaluates each reward probability of a plurality of possible actions according to the probability function based on the action-value function.

At S756, the selecting section can determine whether any unevaluated possible actions remain. If the last possible action has not yet been evaluated, then the operational flow returns to S752. If the last possible action has been evaluated, then the operational flow proceeds to S758.

At S758, the selecting section can determine a high (e.g., above a threshold) or the highest reward probability that was yielded from the evaluations performed by the probability evaluating section at S754.

At S759, the selecting section can select the possible action that is associated with the reward probability determined at S758. In some embodiments, the selected action among the plurality of possible actions yields the largest reward probability from the probability function. Once the possible action has been selected, the operational flow proceeds to cause the selected action, such as S642 in FIG. 6, to be performed.

In alternative embodiments of an operational flow for selecting a possible action, each node of the action can be evaluated individually. Because the value of each node is not affected by the values of other nodes, an operation can determine each action node individually. When all nodes have been determined individually, the action represented by result of each node is the selected action.

Figure 8:
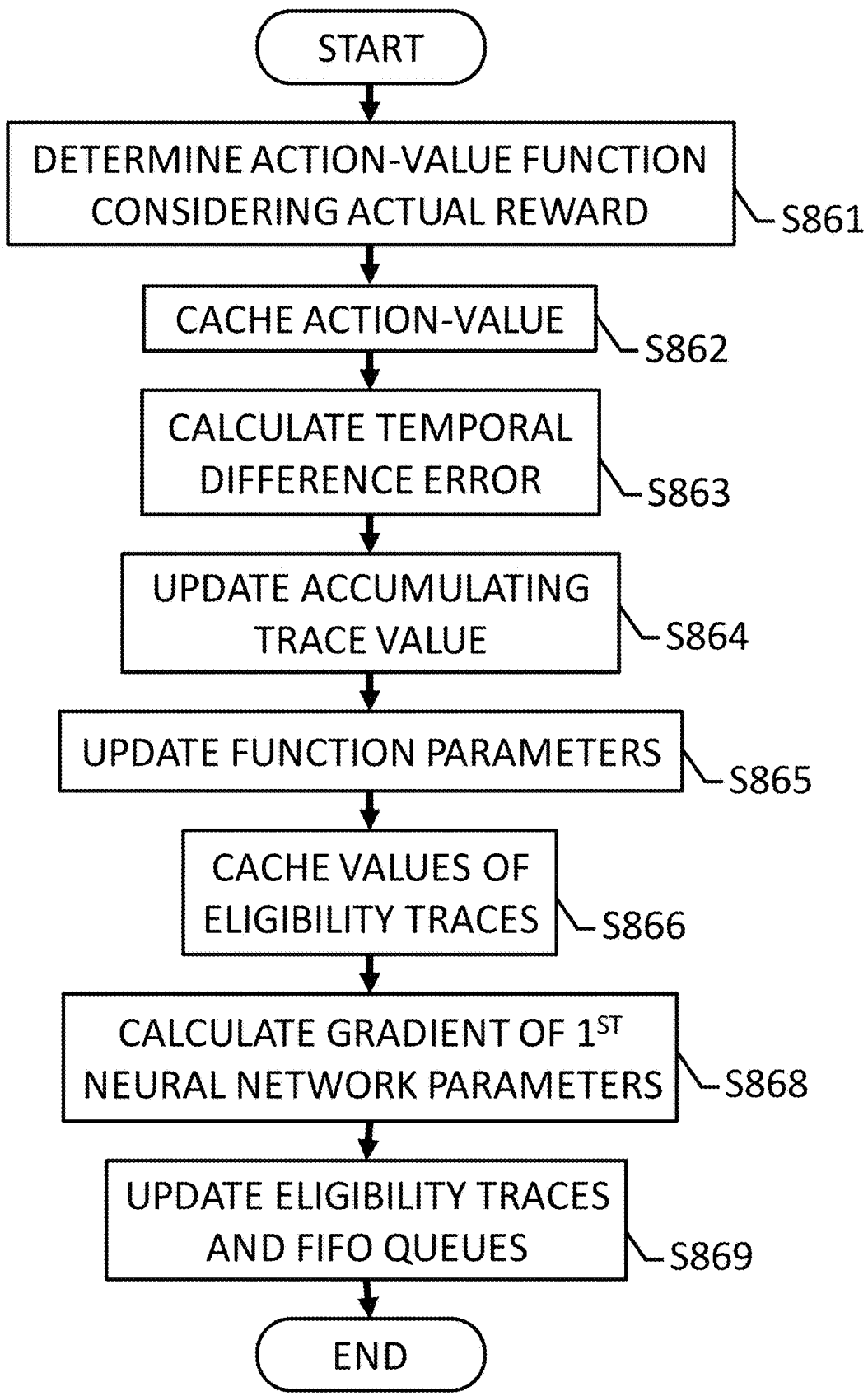
FIG. 8 shows an operational flow for approximating an action-value function, according to some embodiments of the present disclosure.

FIG. 8 shows an operational flow for approximating an action-value function, according to some embodiments of the present disclosure. The operational flow can provide a method for approximating an action-value function of a second neural network of a cooperative neural network system, such as the system in FIG. 5. The operations can be performed by an apparatus, such as apparatus 100, using a second neural network, such as second neural network 130. Before showing the operational flow shown in FIG. 8, some underlying theory is explained below.

An approach for reinforcement learning in general, which can be applied to a second neural network in a cooperative neural network system, is called State-Action-Reward-State-Action (SARSA). SARSA refers to a general class of on-policy TD-learning methods for Reinforcement Learning (RL). SARSA updates an action-value function Q according to Equation 12:

$$Q(S_t,A_t) \leftarrow Q(S_t,A_t) + \eta(R_{t+1} + \gamma Q(S_{t+1},A_{t+1}) - Q(S_t,A_t)), \quad \text{Eq. (12)}$$

In Equation 12, $S_t$ is the (Markovian and observable) state at time t, $A_t$ is the action taken at time t, $R_{t+1}$ is the reward received after taking $A_t$, $\gamma$ is the discount factor for future reward, and $\eta$ is the learning rate. The Markovian state is not always fully observable, and $S_t$ refers to the entire history of observations and actions before t (i.e., $S_t = x^{[:t-1]}$).

In some embodiments, the action-value function can be an energy function of the second neural network. By Eq. (5), the energy of a DyBM having the structure in FIG. 2 can be decomposed into a sum of the energy associated with its individual nodes as described in Equation 13:

$$E_\theta(x^{[t]} | x^{[:t-1]}) = \sum_{j \in A \cup Z} E_\theta(x_j^{[t]} | x^{[:t-1]}), \quad \text{Eq. (13)}$$

In this embodiment of cooperative neural network reinforcement learning, we use the energy associated with the observations to represent the Q-function as described in Equation 14:

$$Q_\theta(x^{[:t-1]}, x^{[t]}) \approx \hat{Q}_w(x^{[:t-1]}, x_A^{[t]}) = -\sum_{j \in A} E_\theta(x_j^{[t]} | x^{[:t-1]}),  \quad \text{Eq. (14)}$$

In Equation 14, $E_\theta(x_j^{[t]}|x^{[:t-1]})$ is given by Eq. (6). Recall that $\alpha_{i,j,k}^{[t-1]}$, $\beta_{i,j,l}^{[t-1]}$, and $\gamma_{i,l}^{[t-1]}$ in Eq. (6) are updated at each time step using Eqs. (3), (4) and (7).

In other embodiments, the action-value function can be a linear function. In many embodiments, such as embodiments where the second neural network is a DyBM, the action-value function is a linear energy function of the second neural network. The approximate Q-function of Equation 14 is linear with respect to the parameters of the DyBM. This is in contrast to SARSA, where the free-energy of a Restricted Boltzmann Machine (RBM) is used to approximate the Q-function. Due to the hidden nodes in an RBM, this is a non-linear function approximation method, which can diverge in theory and practice. However, convergence of SARSA with a linear function approximation can be guaranteed under suitable conditions.

The Q-function can be approximated with a linear function of parameters, $\theta$, as described in Equation 15:

$$Q_\theta(S,A) = \phi(S,A)^T \theta, \quad \text{Eq. (15)}$$

A SARSA learning rule can be given by Equation 16:

$$\theta_{t+1} = \theta_t + \eta_t \Delta_t \phi(S_t, A_t), \quad \text{Eq. (16)}$$

In Equation 16, $\eta_t$ is a learning rate, and $\Delta_t$ is a TD error. The term $\Delta_t$ can be described by Equation 17:

$$\Delta_t = R_{t+1} + \gamma \phi(S_{t+1}, A_{t+1})^T \theta_t - \phi(S_t, A_t)^T \theta_t, \quad \text{Eq. (17)}$$

In this embodiment, given the following conditions, $\forall j \in A$, $\forall i \in A \cup S$, $k=1, \ldots, K$, $l=1, \ldots, L$, the exact DySARSA learning rule can be described by Equations 18, 19, 20, and 21:

$$b_j \leftarrow b_j + \eta_t \Delta_t x_j^{[t]} \quad \text{Eq. (18)}$$

$$u_{i,j,k} \leftarrow u_{i,j,k} + \eta_t \Delta_t \alpha_{i,j,k}^{[t-1]} x_j^{[t]} \quad \text{Eq. (19)}$$

$$v_{i,j,l} \leftarrow v_{i,j,l} + \eta_t \Delta_t \beta_{i,j,l}^{[t-1]} x_j^{[t]} \quad \text{Eq. (20)}$$

$$v_{i,j,l} \leftarrow v_{i,j,l} + \eta_t \Delta_t \gamma_{i,l}^{[t-1]} x_j^{[t]}, \quad \text{Eq. (21)}$$

The TD error can be described by Equation 22:

$$\Delta_t = R_t + \gamma Q_{\theta_t}(x^{[:t]}, x_A^{[t+1]}) - Q_{\theta_{t-1}}(x^{[:t-1]}, x_A^{[t]}). \quad \text{Eq. (22)}$$

Each $v_{i,j,l}$ is duplicated in Eq. (20) and Eq. (21) and thus updated twice in each step. This is just for notational convenience, and the two could be merged.

SARSA can allow selection of a subsequent action on the basis of the values of Q for candidate actions. Therefore, actions are selected based on the policy with Boltzmann exploration. Boltzmann exploration is particularly suitable for DyBM, because Eq. (14) allows sampling of each bit of an action (i.e., $x_j^{[t]}$ for $j \in A$) independently of each other according to Eq. (11) where $\tau > 0$ is the parameter representing temperature, and $\tau \rightarrow 0$ leads to a greedy policy. In some embodiments, operation S754 can use Eq. (11) as the probability function. Notice that the energy is 0 when $x_j^{[t]} = 0$. In this case, DySARSA converges as long as it is greedy in the limit of infinite exploration. Furthermore, recall that the neural and synaptic eligibility traces along with the FIFO queues store the spike timing history in DyBM. As such, the DySARSA learning rule of (Eqs. (18)-(21)) can be viewed as analogous to a possible biological counterpart in the form of reward or TD-error modulated reinforcement learning.

Overall, the DySARSA learning algorithm can proceed as described above, where vector notations: $\alpha^{[t]} \equiv (\alpha_{i,j,k}^{[t]})_{i,j \in A \cup Z, k \in [1,K]}$; $\beta^{[t]}$ and $\gamma^{[t]}$ can be defined analogously.

However, unlike DySARSA, embodiments of cooperative neural network deep reinforcement learning with partial input assistance can use two neural networks: a first multi-layered neural network and a second neural network. Embodiments include methods to update the parameters of a deep feed forward network using the DySARSA TD-error as the cost to learn the parameters by end-to-end backpropagation through the deep feed forward network layers.

In some embodiments where the second neural network is a DyBM as shown in FIG. 2, the action-value function can be evaluated with respect to nodes of the second neural network associated with actions of the action and observation sequence. In other embodiments where the second neural network is a DyBM as shown in FIG. 2, the action-value function can be evaluated with respect to nodes of the second neural network associated with actions and observations of the action and observation sequence.

The operational flow of FIG. 8 can begin after an inputting section, such as inputting section 107, inputs respective values into the cooperative neural networks.

At S861, an action-value determining section, such as action-value determining section 111, can evaluate an action-value function in consideration of an actual reward to determine an action-value. In other words, the approximating the action-value function can further include determining a current action-value from an evaluation of the action-value function in consideration of an actual reward. In some embodiments, the previously cached action-value, such as from a time frame t−2, can be deleted.

At S862, a caching section, such as caching section 112, can cache the action-value determined at a previous iteration of S861. In some embodiments, the approximating the action-value function can further include caching a previous action-value determined from a previous time frame from the action-value function.

At S863, a calculating section, such as calculating section 113, can calculate a temporal difference (TD) error, which can be based on the action-value determined at S861 and the plurality of parameters of the second neural network. In other words, the approximating the action-value function can further include calculating a temporal difference error based on the previous action-value, the current action-value, and the plurality of parameters. The TD-error can be calculated using Eq. 17.

At S864, an updating section, such as updating section 115, can update an accumulating trace value. The accumulating trace value can be calculated using Eq. 10.

At S865, the updating section can update a plurality of function parameters of the second neural network based on the temporal difference error calculated at S863 and at least one learning rate. In some embodiments, the approximating the action-value function can include updating a plurality of parameters of the second neural network based on the temporal difference error and a learning rate. These function parameters can be updated using Eqs. 18-21.

At S866, the caching section can cache the plurality of function parameters updated at S865, which can be used to determine and update eligibility traces of the second neural network. The values of $x^{[t+1]}$, $\alpha^{[t]}$, $\beta^{[t]}$, and $\gamma^{[t]}$ can be updated. In some embodiments, the previous values of $x^{[t+1]}$, $\alpha^{[t]}$, $\beta^{[t]}$, and $\gamma^{[t]}$ can be deleted.

At S868, the calculating section can calculate the gradient of the first neural network parameters. For example, the calculating section can calculate the gradient, $$\frac{\partial \Delta}{\partial \theta_c},$$

of the first neural network parameters with respect to the TD error.

At S869, the updating section can update the eligibility traces and FIFO queues of the second neural network. For example, the updating section can update the plurality of parameters of the neural network includes updating a plurality of eligibility traces and a plurality of first-in-first-out (FIFO) queues. The eligibility traces and FIFO queues can be updated with Eqs. 3, 4, and 7. By updating the parameters of the second neural network, the approximation of a policy function can become more accurate, which can in turn improve the accuracy of the probability function, which can result in the selection of actions that more effectively achieve goals.

In other embodiments of an operational flow for cooperative neural network reinforcement learning, the updating section can update the function parameters of the second neural network every other iteration, every third iteration, and so on. The number of iterations before performing an update can change, and/or can depend on the rewards.

Embodiments of the cooperative neural network partial input assistance can outperform state of the art Deep-Q-Networks (DQNs) challenges such as playing video games in which the images are the observations, and the input controls are the actions, as represented by a Markov Decision Process (MDP), in both accuracy and speed (in terms of iterations). Such embodiments can demonstrate much more pronounced outperformance when the video game play is represented as a POMDP, in both accuracy and speed (in terms of iterations). Moreover, such embodiments require less computational resources than DQN largely because the embodiments only require one back propagation, whereas DQN requires two. Applications of such embodiments are not limited to video games, but can also include autonomous driving, finance, etc.

Figure 9:
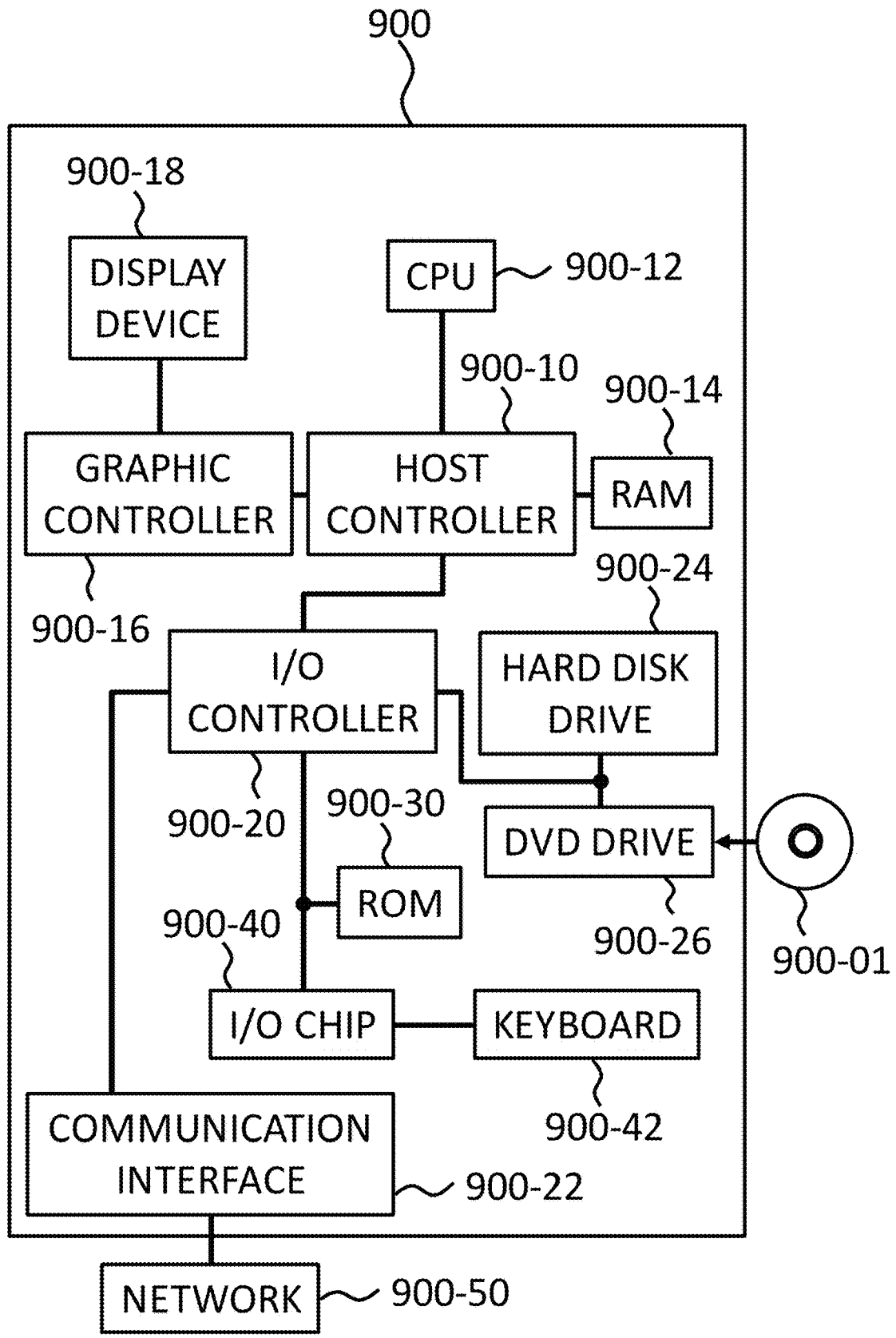
FIG. 9 shows an exemplary hardware configuration of a computer configured for cooperative neural network reinforcement learning, according to some embodiments of the present disclosure.

FIG. 9 shows an exemplary hardware configuration of a computer configured to perform the foregoing operations, according to some embodiments of the present disclosure. A program that is installed in the computer 900 can cause the computer 900 to function as or perform operations associated with apparatuses of the embodiments of the present disclosure or one or more sections (including modules, components, elements, etc.) thereof, and/or cause the computer 900 to perform processes of the embodiments of the present disclosure or steps thereof. Such a program can be executed by the CPU 900-12 to cause the computer 900 to perform certain operations associated with some or all of the blocks of flowcharts and block diagrams described herein.

The computer 900 according to the present embodiment includes a CPU 900-12, a RAM 900-14, a graphics controller 900-16, and a display device 900-18, which are mutually connected by a host controller 900-10. The computer 900 also includes input/output units such as a communication interface 900-22, a hard disk drive 900-24, a DVD-ROM drive 900-26 and an IC card drive, which are connected to the host controller 900-10 via an input/output controller 900-20. The computer also includes legacy input/output units such as a ROM 900-30 and a keyboard 900-42, which are connected to the input/output controller 900-20 through an input/output chip 900-40.

The CPU 900-12 operates according to programs stored in the ROM 900-30 and the RAM 900-14, thereby controlling each unit. The graphics controller 900-16 obtains image data generated by the CPU 900-12 on a frame buffer or the like provided in the RAM 900-14 or in itself, and causes the image data to be displayed on the display device 900-18.

The communication interface 900-22 communicates with other electronic devices via a network 900-50. The hard disk drive 900-24 stores programs and data used by the CPU 900-12 within the computer 900. The DVD-ROM drive 900-26 reads the programs or the data from the DVD-ROM 900-01, and provides the hard disk drive 900-24 with the programs or the data via the RAM 900-14. The IC card drive reads programs and data from an IC card, and/or writes programs and data into the IC card.

The ROM 900-30 stores therein a boot program or the like executed by the computer 900 at the time of activation, and/or a program depending on the hardware of the computer 900. The input/output chip 900-40 can also connect various input/output units via a parallel port, a serial port, a keyboard port, a mouse port, and the like to the input/output controller 900-20.

A program is provided by computer readable media such as the DVD-ROM 900-01 or the IC card. The program is read from the computer readable media, installed into the hard disk drive 900-24, RAM 900-14, or ROM 900-30, which are also examples of computer readable media, and executed by the CPU 900-12. The information processing described in these programs is read into the computer 900, resulting in cooperation between a program and the above-mentioned various types of hardware resources. An apparatus or method can be constituted by realizing the operation or processing of information in accordance with the usage of the computer 900.

For example, when communication is performed between the computer 900 and an external device, the CPU 900-12 can execute a communication program loaded onto the RAM 900-14 to instruct communication processing to the communication interface 900-22, based on the processing described in the communication program. The communication interface 900-22, under control of the CPU 900-12, reads transmission data stored on a transmission buffering region provided in a recording medium such as the RAM 900-14, the hard disk drive 900-24, the DVD-ROM 900-01, or the IC card, and transmits the read transmission data to network 900-50 or writes reception data received from network 900-50 to a reception buffering region or the like provided on the recording medium.

In addition, the CPU 900-12 can cause all or a necessary portion of a file or a database to be read into the RAM 900-14, the file or the database having been stored in an external recording medium such as the hard disk drive 900-24, the DVD-ROM drive 900-26 (DVD-ROM 900-01), the IC card, etc., and perform various types of processing on the data on the RAM 900-14. The CPU 900-12 can then write back the processed data to the external recording medium.

Various types of information, such as various types of programs, data, tables, and databases, can be stored in the recording medium to undergo information processing. The CPU 900-12 can perform various types of processing on the data read from the RAM 900-14, which includes various types of operations, processing of information, condition judging, conditional branch, unconditional branch, search/ replace of information, etc., as described throughout this disclosure and designated by an instruction sequence of programs, and writes the result back to the RAM 900-14. In addition, the CPU 900-12 can search for information in a file, a database, etc., in the recording medium. For example, when a plurality of entries, each having an attribute value of a first attribute is associated with an attribute value of a second attribute, are stored in the recording medium, the CPU 900-12 can search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules can be stored in the computer readable media on or near the computer 900. In addition, a recording medium such as a hard disk or a RAM provided in a server system connected to a dedicated communication network or the Internet can be used as the computer readable media, thereby providing the program to the computer 900 via the network.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to individualize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present disclosure have been described, the technical scope of the disclosure is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the disclosure.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising a computer readable storage medium having program instructions embodied therewith, wherein the computer readable storage medium is not a transitory signal per se, the program instructions executable by a processor to cause the processor to perform a method comprising:
    obtaining an action and observation sequence including a plurality of time frames, each time frame including action values and observation values;
    inputting at least some of the observation values of each time frame of the action and observation sequence sequentially into a first neural network including a plurality of first parameters;
    inputting the action values of each time frame of the action and observation sequence and output values from the first neural network corresponding to the at least some of the observation values of each time frame of the action and observation sequence sequentially into a second neural network including a plurality of second parameters;
    approximating an action-value function using the second neural network by:
        calculating a temporal difference error based on a previous action-value, a current action-value, and the plurality of second parameters; and
        updating the plurality of second parameters based on the temporal difference error and a learning rate by updating a plurality of eligibility traces and a plurality of first-in-first-out (FIFO) queues; and
    updating the plurality of first parameters using backpropagation.

2. The computer program product according to claim 1, wherein the updating of the plurality of first parameters uses the temporal difference error.

3. The computer program product of claim 2, wherein the updating of the plurality of first parameters is based on backpropagation of a gradient of the plurality of first parameters with respect to the temporal difference error generated by the second neural network.

4. The computer program product of claim 2, wherein approximating the action-value function further comprises:
    determining a current action-value from an evaluation of the action-value function in consideration of an actual reward; and
    caching a previous action-value determined for a previous time frame from the action-value function.

5. The computer program product of claim 4, wherein the action-value function is determined with respect to nodes of the second neural network associated with actions of the action and observation sequence.

6. The computer program product of claim 1, wherein the action-value function is an energy function of the second neural network.

7. The computer program product of claim 1, wherein the action-value function is a linear function.

8. The computer program product according to claim 1, wherein inputting to the second neural network further comprises inputting remaining observation values into the second neural network.

9. The computer program product of claim 1, wherein the second neural network comprises:
    a plurality of layers of nodes among a plurality of nodes, each layer sequentially forwarding input values of a time frame of the action and observation sequence to a subsequent layer among the plurality of layers, the plurality of layers of nodes comprising:
        an input layer including the plurality of input nodes among the plurality of nodes, the input nodes receiving input values representing an action and an observation of a current time frame of the action and observation sequence; and
        a plurality of intermediate layers, each node in each intermediate layer forwarding a value representing an action or an observation to a node in a subsequent or shared layer; and
    a plurality of weight values among the plurality of second parameters of the second neural network, each weight value to be applied to each value in a corresponding node to obtain a value propagating from a pre-synaptic node to a post-synaptic node.

10. The computer program product of claim 1, wherein obtaining an action and observation sequence further comprises:

selecting an action, using the second neural network, with which to proceed from a current time frame of the action and observation sequence to a subsequent time frame of the action and observation sequence;

causing the selected action to be performed; and obtaining an observation of the subsequent time frame of the action and observation sequence.

11. The computer program product of claim 10, wherein the observation obtained includes an actual reward.

12. The computer program product of claim 10, wherein selecting an action includes evaluating each reward probability of a plurality of possible actions according to a probability function based on the action-value function; and wherein the selected action among the plurality of possible actions yields a largest reward probability from the probability function.

13. The computer program product according to claim 1, wherein the first neural network comprises:

a plurality of layers of nodes among a plurality of nodes, each layer forwarding input values to a subsequent layer among the plurality of layers, the plurality of layers of nodes comprising:

an input layer including the plurality of input nodes among the plurality of nodes, the input nodes receiving input values representing an observation of a current time frame of the action and observation sequence;

at least one intermediate layer, each node in the at least one intermediate layer forwarding a value representing an observation to a node in a subsequent layer; and an output layer, each node in the output layer converting a value representing an observation to a value between 0 and 1; and a plurality of weight values among the plurality of first parameters of the first neural network, each weight value to be applied to each value in a corresponding node to obtain a value propagating from a pre-synaptic node to a post-synaptic node.

14. A method comprising:

obtaining an action and observation sequence including a plurality of time frames, each time frame including action values and observation values;

inputting at least some of the observation values of each time frame of the action and observation sequence sequentially into a first neural network including a plurality of first parameters;

inputting the action values of each time frame of the action and observation sequence and output values from the first neural network corresponding to the at least some of the observation values of each time frame of the action and observation sequence sequentially into a second neural network including a plurality of second parameters;

approximating an action-value function using the second neural network by:

calculating a temporal difference error based on a previous action-value, a current action-value, and the plurality of second parameters; and updating the plurality of second parameters based on the temporal difference error and a learning rate by updating a plurality of eligibility traces and a plurality of first-in-first-out (FIFO) queues; and updating the plurality of first parameters using backpropagation.

15. The method according to claim 14, wherein the updating of the plurality of first parameters uses the temporal difference error.

16. An apparatus comprising:

an obtaining section configured to obtain an action and observation sequence including a plurality of time frames, each time frame including action values and observation values;

an input section configured to:

input at least some of the observation values of each time frame of the action and observation sequence sequentially into a first neural network including a plurality of first parameters; and input the action values of each time frame of the action and observation sequence and output values from the first neural network corresponding to the at least some of the observation values of each time frame of the action and observation sequence sequentially into a second neural network including a plurality of second parameters;

an approximating section configured to approximate an action-value function using the second neural network by:

calculating a temporal difference error based on a previous action-value, a current action-value, and the plurality of second parameters; and updating the plurality of second parameters based on the temporal difference error and a learning rate by updating a plurality of eligibility traces and a plurality of first-in-first-out (FIFO) queues; and an updating section configured to update the plurality of first parameters using backpropagation.

17. The apparatus according to claim 16, wherein the updating section is further configured to update the plurality of first parameters using the temporal difference error.

* * * * *